(12) United States Patent
Hirai

(10) Patent No.: US 7,341,798 B2
(45) Date of Patent: Mar. 11, 2008

(54) MAGNETIC TAPE MEDIUM

(75) Inventor: Noriyuki Hirai, Miyagi (JP)

(73) Assignee: Sony Corporation, Tokyo (JP)

( * ) Notice: Subject to any disclaimer, the term of this patent is extended or adjusted under 35 U.S.C. 154(b) by 317 days.

(21) Appl. No.: 11/132,791

(22) Filed: May 19, 2005

(65) Prior Publication Data
US 2005/0260458 A1   Nov. 24, 2005

(30) Foreign Application Priority Data
May 21, 2004   (JP)   ............................ P2004-151425

(51) Int. Cl.
*G11B 5/716* (2006.01)
(52) U.S. Cl. .................................. 428/840.1
(58) Field of Classification Search ............. 428/845.6, 428/839.2, 839.6, 840.1
See application file for complete search history.

(56) References Cited

U.S. PATENT DOCUMENTS 5,997,987 A * 12/1999 Koizumi et al. ............ 428/141

2003/0054204 A1 * 3/2003 Kasuga et al. ....... 428/694 BM
2003/0203240 A1 * 10/2003 Seng et al. ........... 428/694 BB
2006/0087767 A1 * 4/2006 Hirai ......................... 360/134

\* cited by examiner

*Primary Examiner*—Holly Rickman
*Assistant Examiner*—Gary D. Harris
(74) *Attorney, Agent, or Firm*—Sonnenschein Nath & Rosenthal LLP

(57) ABSTRACT

A magnetic recording medium is provided that can ensure stable recording and reproducing characteristics with little off-track even when a track density in the direction of width of the tape is very high and 50 lines/mm or more, an off-track margin is 5 μm or smaller, and a variation that is permitted at maximum as a dimensional variation in the direction of width of the tape itself due to environmental factors such as the change of temperature and humidity, the change of tension, a creep, etc. is small as low as 0.10% or less. Assuming that Young's modulus in the direction of width of a non-magnetic substrate is X and Young's modulus in the direction of width of the back layer is Y, X is 850 kg/mm² or more, or when X is less than 850 kg/mm², X×Y is 6×10⁵ or more, and assuming that Young's modulus in the direction of width of a layer including a magnetic layer is Z, Y/Z is not larger than 6.0.

6 Claims, 1 Drawing Sheet

MAGNETIC TAPE MEDIUM

CROSS REFERENCES TO RELATED APPLICATIONS

The present invention contains subject matter related to Japanese Patent Application JP 2004-151425 filed in the Japanese Patent Office on May 21, 2004, the entire contents of which being incorporated herein by reference.

BACKGROUND OF THE INVENTION

1. Field of the Invention

The present invention relates to a magnetic tape medium in which data is recorded and reproduced in the longitudinal direction and more particularly to a magnetic tape medium that ensures a high dimensional stability in the direction of width and is excellent in its off-track characteristics.

2. Description of the Related Art

In recent years, a quantity of information has been extraordinarily increased in accordance with the propagation of an internet or a digital recording. The capacity of a recording medium for backing up the information as data has been increasingly expanded and the density thereof has been progressively enhanced.

In the tape medium accommodated in a cartridge in a wound state as the recording medium for backing up, a linear recording type system has been put to practical use. In the linear recording type system, a fixed head having many magnetoresistive heads disposed is used for the purpose of a high capacity to record and reproduce data in the longitudinal direction of the tape. To achieve a higher capacity, various methods are employed. For instance, a short wavelength recording is carried out by reducing the thickness of a magnetic recording layer, a track density in the direction of width of the tape is increased, the thickness itself of the tape is reduced to increase the length for one reel, etc.

Further, an attempt has been made to raise the transfer speed of the data by providing many heads and increasing the relative speed between the tape and the heads. When the thickness of the magnetic recording layer is reduced to carry out the short wavelength recording, an output is undesirably decreased due to a small spacing between the magnetic recording layer and the heads, or a durability in traveling is undesirably deteriorated during traveling many times. Accordingly, various examinations have been carried out.

When the track density in the direction of width of the tape is increased, what is called an off-track inconveniently occurs that a track does not exist in or deviate from the position of the tape to be originally read by a magnetic head, due to the dimensional change of the tape itself owing to a variation in the direction of width of the tape during traveling of the tape at high speed or an environmental factor. This problem especially obviously appears in a thin film medium in which traveling characteristics become unstable and the change of the tape itself due to the environmental factor is increased. To avoid the off-track, a method in which a servo signal is recorded on the tape to take a correct tracking is proposed.

In this servo system, there is a method in which the servo signal is magnetically or optically recorded on the magnetic layer side or the back layer side of the tape. As for the variation in the direction of width during traveling of the tape which is one of the factors of the occurrence of the off-track in the direction of width of the tape, a method has been proposed for improving a flapping phenomenon in the edge of the tape, as disclosed in Japanese Patent Application Laid-Open No. 2003-132526. As another method for decreasing the dimensional change of the tape itself due to the environmental factor, a method has been proposed for decreasing a coefficient of thermal/hygroscopic expansion of the tape or a non-magnetic substrate, as disclosed in Japanese Patent Application Laid-Open No. hei 11-250449.

However, when the track density in the direction of width of the tape is relatively low and an allowable off-track amount (((recording track width)−(reproducing track width))/2, refer an allowable off-track amount to as an off-track margin, hereinafter) is adequately large, the dimensional change of the tape due to the environmental factor does not cause a serious problem in an actual environment. When the variation in direction of width during traveling of the tape is relatively large, this does not likewise cause a great problem.

SUMMARY OF THE INVENTION

However, when the track density in the direction of width of the tape is very high and is 50 lines/mm or more and the off-track margin is 5 µm or smaller and a variation that is permitted at maximum as a dimensional variation in the direction of width of the tape itself due to the environmental factors such as the change of temperature and humidity, the change of tension, a creep, etc. is small as low as 0.10% or less, the off-track has been apparently liable to occur.

Namely, when the track density in the direction of width of the tape is increased to decrease the width of the track, even if the rate of the variation in the direction width during traveling of the tape is not greatly changed, the variation that is permitted at maximum as the dimensional variation of the tape itself due to the environmental factors such as the change of temperature and humidity, the change of tension, the creep, etc. is decreased more and more.

Further, such a tape medium is not used only in the same recording and reproducing device (refer the recording and reproducing device as to a drive, hereinafter). Since data is sometimes recorded and reproduced in some drives, spaces of the magnetic heads are slightly different between the drives. This difference needs to be taken into account in the off-track margin. Under these circumstances, a slight dimensional change in the direction of width may be apt to cause the deterioration of a reproduced output or the off-track.

With the above-described problems taken into consideration, it is desirable to provide a magnetic tape medium that has little off-track and can ensure stable recording and reproducing characteristics even when a track density in the direction of width of the tape is very high and is 50 lines/mm or more and an off-track margin is 5 µm or smaller and a variation that is permitted at maximum as a dimensional variation in the direction of width of the tape itself due to environmental factors such as the change of temperature and humidity, the change of tension, a creep, etc. is small as low as 0.10% or less.

In order to solve the above-described problems, the inventors of the invention eagerly studied and devised the present invention. According to an embodiment of the present invention, a magnetic tape medium for recording and reproducing data in the longitudinal direction includes, on one main surface of a non-magnetic substrate, at least one magnetic layer on which magnetic dispersion solution obtained by dispersing ferromagnetic powder in a binding agent is applied with the thickness of 0.3 µm or smaller and a back layer on which dispersion solution obtained by dispersing inorganic pigment in a binding agent is applied, on a main surface opposite to a side in which the magnetic layer is formed. A servo signal for a tracking control is recorded on either the magnetic layer or the back layer, or on both the layers. A track density in the direction of width being 50 lines/mm or more. An off-track margin A equal to ((recording track width)−(reproducing track width))/2 being 5 μm or smaller. A variation that is permitted at maximum as a dimensional variation in the direction of width due to environmental factors such as the change of temperature and humidity, the change of tension, a creep, etc. is small as low as 0.10% or less. Assuming that Young's modulus in the direction of width of the non-magnetic substrate is X and Young's modulus in the direction of width of the back layer is Y, X is 850 kg/mm$^2$ or more, or when X is less than 850 kg/mm$^2$, X×Y is 6×10$^5$ or more. Assuming that Young's modulus in the direction of width of the layer including the magnetic layer is Z, Y/Z is not larger than 6.0.

Further, according to another embodiment of the present invention, a magnetic tape medium for recording and reproducing data in the longitudinal direction includes, on one main surface of a non-magnetic substrate, at least one magnetic layer on which magnetic dispersion solution obtained by dispersing ferromagnetic powder in a binding agent is applied with the thickness of 0.3 μm or smaller and a back layer on which dispersion solution obtained by dispersing inorganic pigment in a binding agent is applied, on a main surface opposite to a side in which the magnetic layer is formed. A servo signal for a tracking control is recorded on either the magnetic layer or the back layer, or on both the layers. A track density in the direction of width is 50 lines/mm or more. An off-track margin A equal to ((recording track width)−(reproducing track width))/2 is 5 μm or smaller. A variation that is permitted at maximum as a dimensional variation in the direction of width due to environmental factors such as the change of temperature and humidity, the change of tension, a creep, etc. is small as low as 0.10% or less. Films made of a metallic material selected from metal, semimetal, alloy, and oxides and compounds of them are provided on both the surfaces of the non-magnetic substrate. The back layer is formed by dispersing inorganic powder including plate shaped or acicular shaped inorganic powder in a binding agent with the thickness of 0.1 to 1.5 μm.

Further, a magnetic tape medium according to another embodiment of the present invention wherein a coefficient of hygroscopic expansion in the direction of width is not higher than 5.0×10$^{-6}$/% RH.

Further, a magnetic tape medium according to another embodiment of the present invention wherein (coefficient of thermal expansion in the direction of width)−(coefficient of thermal expansion of a magnetic head for recording and reproducing data) is (−1.5 to 1.5)×10$^{-6}$/° C.

Still further, a magnetic tape according to another embodiment of the present invention wherein a water repellent effect is given to an edge.

Still further, a magnetic tape medium according to another embodiment of the present invention wherein a rate of dimension change in the direction of width due to the change of tension exerted in the longitudinal direction is 120×10$^{-6}$/N or smaller.

Furthermore, a magnetic tape according to another embodiment of the present invention wherein an amount of deformation in the direction of width when the tape is held for 100 hours under a state that the tension of 1 N is exerted in the longitudinal direction is 10×10$^{-6}$ or smaller.

According to an embodiment of the present invention, a coefficient of thermal expansion and a coefficient of hygroscopic expansion in the direction of width of the magnetic tape can be lowered and the dimensional change in the direction of width can be suppressed. Accordingly, the magnetic tape medium can be provided in which the dimensional change in the direction of width due to the environmental factors can be suppressed to a low value and stable recording and reproducing characteristics can be assured with less off-track even when the track density in the direction of width is very high.

According to another embodiment of the present invention, the films made of the metallic material provided on both the surfaces of the non-magnetic substrate can interrupt water that enters the non-magnetic substrate occupying most of the thickness of the magnetic tape to cause an expansion so that the coefficient of hygroscopic expansion in the direction of width of the magnetic tape can be reduced.

Further, the back layer formed by dispersing inorganic powder including plate shaped or acicular shaped inorganic powder in a binding agent with the thickness of 0.1 to 1.5 μm is provided, so that the strength of the back layer in the inner planar direction is increased. As a result, the strength of the magnetic tape is increased so that the coefficient of thermal expansion and the coefficient of hydgroscopic expansion in the direction of width can be reduced.

Since the strength of the tape in the inner planar direction is enhanced, the dimensional variation in the direction of width that occurs in accordance with the effect of Poisson's ratio when the tension is exerted in the longitudinal direction is decreased. Further, the variation of creep under a state that the tension of 1 N is exerted for a long time can be also decreased.

Therefore, the magnetic tape medium can be provided in which the dimensional change in the direction of width due to the environmental factors can be suppressed to a low value and stable recording and reproducing characteristics can be assured with less off-track even when the track density in the direction of width is very high.

DETAILED DESCRIPTION OF THE PREFERRED EMBODIMENTS

Figure 1:
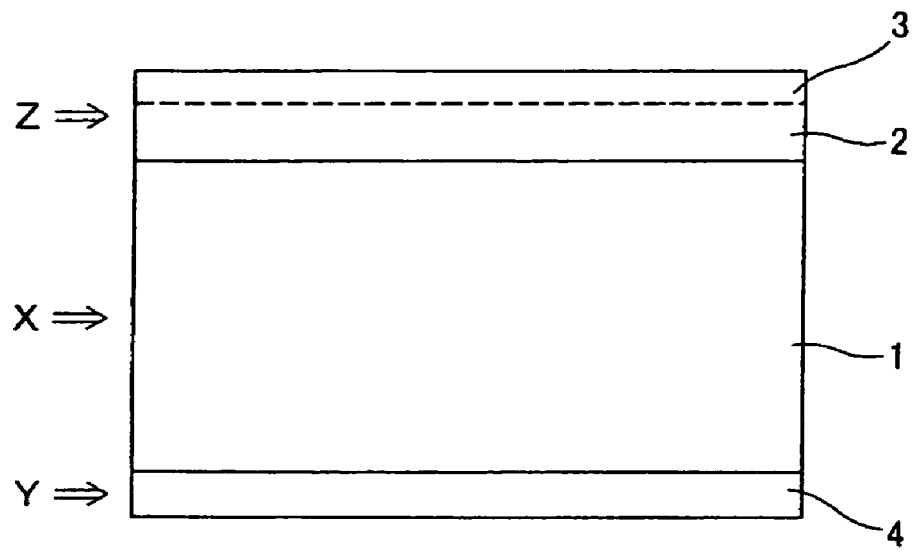
FIG. 1 is a sectional view showing an embodiment of the present invention.

Now, embodiments of the present invention will be described below. Initially, a fundamental idea of an embodiment of the present invention is directed to a magnetic tape medium for recording and reproducing data in the longitudinal direction including, on one main surface of a non-magnetic substrate, at least one magnetic layer on which magnetic dispersion solution obtained by dispersing ferromagnetic powder in a binding agent is applied with the thickness of 0.3 μm or smaller and a back layer on which dispersion solution obtained by dispersing inorganic pigment in a binding agent is applied, on a main surface opposite to a side in which the magnetic layer is formed. A servo signal for a tracking control is recorded on either the magnetic layer or the back layer, or on both the layers. A track density in the direction of width being 50 lines/mm or more. An off-track margin A equal to ((recording track width)−(reproducing track width))/2 being 5 μm or smaller. A variation that is permitted at maximum as a dimensional variation in the direction of width due to environmental factors such as the change of temperature and humidity, the change of tension, a creep, etc. is small as low as 0.10% or less. Assuming that Young's modulus in the direction of width of the non-magnetic substrate is X and Young's modulus in the direction of width of the back layer is Y, X is 850 kg/mm$^2$ or more, or when X is less than 850 kg/mm$^2$, X×Y is 6×10$^5$ or more. Assuming that Young's modulus in the direction of width of the layer including the magnetic layer is Z, Y/Z is not larger than 6.0. Accordingly, as the most important feature, even when the track density is very high, the dimensional variation in the direction of width due to the environmental factors can be apparently suppressed to a low level and stable recording and reproducing characteristics with less off-track can be ensured.

The rate of the change of width due to the change of temperature and humidity that occupies the environmental factors under which the width of the magnetic tape changes is high. It is necessary for the tape to increase the strength in the direction of width for meeting the change of the width due to the change of temperature and humidity. Thus, the Young's modulus in the direction of width of the non-magnetic substrate that occupies the substantial part of the thickness of the tape is raised to 850 kg/mm$^2$ so that the coefficient of thermal expansion and the coefficient of hygroscopic expansion in the direction of width of the tape can be decreased. Otherwise, even if the Young's modulus in the direction of width of the non-magnetic substrate is lower than 850 kg/mm$^2$, the Young's modulus in the direction of width of the back layer is controlled to a prescribed value or larger, that is, X×Y is set to 6×10$^5$ or more. Thus, the coefficient of thermal expansion and the coefficient of hygroscopic expansion in the direction of width of the tape can be lowered.

Further, when the Young's modulus in the direction of width of the back layer is especially increased to more suppress the dimensional change, the cupping of the tape is undesirably increased, an initial output is deteriorated, or the cupping itself is greatly changed to further increase the change of the width of the tape. Accordingly, it is apparently important to control the ratio (Y/Z) of the Young's modulus in the direction of width of the back layer to the Young's modulus in the direction of width of the layer including the magnetic layer provided on the other surface of the non-magnetic substrate to 6.0 or smaller in order to obtain more stable characteristics.

The magnetic tape of the present invention includes the magnetic layer with the thickness of 0.3 μm or less that is obtained by applying a magnetic paint including magnetic powder such as Fe, Co, etc. and various kinds of binding agents on one surface of the non-magnetic substrate made of a polyester plastic film. Further, the other surface of the non-magnetic substrate has the back layer obtained by applying the dispersion solution in which the organic pigment is dispersed in the binding agent to give suitable traveling characteristics thereto. The servo signal for a tracking control is magnetically or optically recorded on either the magnetic layer or the back layer, or both the layers.

As materials of the non-magnetic substrate in the present invention, polyethylene terephthalate, polyethylene naphthalate, polytetramethylene terephthalate, poly-1,4-cyclohexylene dimethylene terephthalate, polyethylene-p-oxybenzoate, polyimide, polyamide, etc. may be exemplified as ordinary films. The polyester plastic films such as polyethylene terephthalate, polyethylene naphthalate, etc. are especially preferable from the viewpoints of high productivity and relative inexpensiveness.

These films may have a single-layer structure or a multi-layer structure. For the purpose of improving an adhesive property, a surface may be subjected to a surface treatment such as a corona discharge process or an electron beam irradiation process or a formation of an easily adhesive layer. For the purpose of reducing the coefficient of hygroscopic expansion, the surface may undergo a water repellent process.

For the purpose of controlling a surface property and stability in traveling, an inorganic or organic filler such as calcium carbonate, silica, aluminum oxide, polystyrene, etc. may be added therein. As a surface roughness Ra, the surface roughness of the magnetic paint applied surface of the magnetic layer is preferably 0.5 to 8 nm and especially preferably 0.5 to 6 nm. When the surface roughness is smaller than 0.5 nm, a friction with a guide roll is extremely high upon producing the tape to obtain an unstable travel. Accordingly, the above-described surface roughness is not preferable.

On the contrary, when the surface roughness is larger than 8 nm, the surface roughness of the tape after the magnetic layer is applied thereto is increased to increase a spacing loss between the tape and the head. Accordingly, the above-described surface roughness is not preferable. The surface roughness Ra of the dispersion solution applied surface of the back layer is preferably 4 to 25 nm and especially preferably 5 to 15 nm. When the surface roughness is smaller than 4 nm, the unstable travel is caused in processes like the magnetic paint applied surface of the magnetic layer. Thus, the above-described surface roughness is not preferable.

Conversely, when the surface roughness is larger than 25 nm, the surface roughness of the tape after the back layer is applied thereto is increased, the roughness of the back layer is transferred to the magnetic layer, when the tape is wound and stored in processes or when the tape is wound and stored in a cartridge. As a result, the roughness of the magnetic layer is increased to cause a spacing loss. Accordingly, the above-described surface roughness is not preferable.

The thickness of the non-magnetic substrate is preferably 2.0 to 8.0 μm and particularly preferably 3.0 to 6.5 μm. When the film is thinner than 2.0 μm, not only the film itself is hardly produced, but also the strength is extremely lowered to decrease a durability in traveling, the change of the width is increased due to the change of tension exerted in the longitudinal direction or creep characteristics are deteriorated. On the contrary, when the film is thicker than 8.0 μm, the thickness of the magnetic tape itself is increased to decrease the length of the tape that can be wound per reel of the cartridge. Thus, the thick film prevents a high capacity from being realized.

The Young's modulus in the longitudinal direction of the non-magnetic substrate is preferably 600 kg/mm$^2$ or higher, particularly preferably 750 kg/mm$^2$ or higher, and more preferably 800 kg/mm$^2$ or higher. When the Young's modulus is lower than 600 kg/mm$^2$, the strength of the magnetic tape itself is weakened or the durability in traveling is deteriorated due to repeated traveling operations. Thus, the Young's modulus lower than 600 kg/mm$^2$ is not preferable.

Especially to reduce the coefficient of hygroscopic expansion or to reinforce the non-magnetic substrate, a film made of a metallic material selected from metal, semimetal, alloy, and oxides and compounds of them or a film made of graphite may be formed by a method such as a sputtering method, a vacuum deposition method, an ion plating method, etc. For the purpose of reducing the coefficient of hygroscopic expansion, these films are preferably provided on both the surfaces of the non-magnetic substrate.

As the metallic materials of the film, for instance, metals such as Al, Zn, Ag, Cu, Fe, Ni, etc., semimetals such as Si, Ge, As, etc., alloys such as Fe—Ni, Fe—Cu, etc., and oxides such as $Al_2O_3$, ZnO, $SiO_2$, etc. may be exemplified. The oxides may be produced by introducing prescribed oxygen gas upon forming a metallic film.

Between the non-magnetic substrate and the magnetic layer, and between the non-magnetic substrate and the back layer, non-magnetic intermediate layers made of various kinds of inorganic power and biding agents may be provided. Especially, the non-magnetic intermediate layer between the non-magnetic substrate and the magnetic layer is preferably provided with the thickness of 0.2 to 2.5 μm to apply the magnetic layer in a stable way and increase the durability in traveling.

Further, as the magnetic powder mixed in the magnetic layer, the binding agent, a dispersing agent, an abrasive agent, an antistatic agent, a rust preventive, a lubricant and a solvent employed for preparing the magnetic dispersion solution, any of usually well-known materials can be used without limitation.

As the magnetic powder, for instance, ferromagnetic iron powder, ferromagnetic iron-cobalt powder, ferromagnetic iron oxide powder, ferromagnetic chromium dioxide powder, ferromagnetic alloy powder, hexagonal barium ferrite powder, etc. may be exemplified.

As the binding agent, for instance, vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic ester-acrylonitrile copolymer, acrylic ester-vinylidene chloride copolymer, methacrylic acid-vinylidene chloride copolymer, methacrylic ester-styrene copolymer, a thermoplastic polyurethane resin, a phenoxy resin, polyvinyl fluoride, vinylidene chloride-acrylonitrile copolymer, butadiene-acrylonitrile copolymer, acrylonitrile-butadiene-methacrylic acid copolymer, polyvinyl butyral, cellulose derivative, styrene-butadiene copolymer, a polyester resin, a polyamide resin, a phenolic resin, an epoxy resin, a thermosetting polyurethane resin, an urea resin, a melamine resin, an alkyd resin, an urea-formaldehyde resin, or mixtures of them, etc. may be exemplified. The polyvinyl resin and the polyurethane resin among them are respectively preferably independently used or the mixture of them is preferably used. Further, an isocyanate compound may be used as a cross-linking agent for them to more improve the durability. Further, as an amount of the binding agent in the magnetic layer, the binding agent of 10 to 50 parts by weight is preferably used relative to the magnetic powder of 100 parts by weight.

As the abrasive agent, for instance, alumina, chromium oxide, titanium oxide, calcium carbonate, silica, etc. may be exemplified. As an amount of the abrasive agent in the magnetic layer, the abrasive agent of 2 to 40 parts by weight is preferably used relative to the magnetic powder of 100 parts by weight, and the abrasive agent of 5 to 30 parts by weight is more preferably used.

As the antistatic agent, for instance, carbon black is ordinarily exemplified. The carbon black is advantageous not only as the antistatic agent, but also for improving the durability in traveling. The carbon black of 0.2 to 30 parts by weight, preferably, 0.5 to 15 parts by weight is desirably mixed in the magnetic powder of 100 parts by weight. The average particle diameter of the carbon black ranges from 5 to 500 nm or so. The carbon black preferably having the average particle diameter of 5 to 150 nm and more preferably having the average diameter of 10 to 100 nm is preferably independently used or a plurality sets of the carbon blacks is combined together and used. Specifically, well-known materials such as acetylene black, furnace black, thermal black, etc. may be independently used or a plurality of the materials may be used.

As the lubricant, for instance, higher fatty acids such as myristic acid, palmitic acid, stearic acid, oleic acid, linoleic acid, fatty acid esters of these fatty acids, fatty acid amide, etc. may be exemplified. The fatty acids, the fatty acid esters and the fatty acid amide are respectively combined together and the obtained product is most preferably used among them. As an amount of addition, the fatty acid of 0.1 to 3 parts by weight, the fatty acid ester of 0.1 to 3 parts by weight and the fatty acid amide of 0.1 to 1.5 parts by weight are preferably added relative to the magnetic powder of 100 parts by weight.

Further, as the solvent for preparing the magnetic dispersion solution, for instance, ketone based solvents such as acetone, methyl ethyl ketone, methyl isobutyl ketone, cyclohexanone, etc., ester based solvents such as methyl acetate, ethyl acetate, butyl acetate, ethyl lactate, glycol acetate monoethyl ester, etc., glycol ether based solvents such as glycol monoethyl ether, dioxane, etc., aromatic hydrocarbon based solvents such as benzene, toluene, xylene, etc., organic chlorine compound based solvents such as methylene chloride, ethylene chloride, carbon tetrachloride, chloroform, ethylene chlorohydrin, dichloro benzene, etc. may be exemplified.

Further, the magnetic layer is formed to have the thickness of 0.3 μm or less. When the magnetic layer has the thickness of 0.3 μm or more, a short wavelength recording for a high density is interrupted.

Now, the non-magnetic intermediate layer that is preferably provided with the thickness of 0.2 to 2.5 μm for the purpose of applying the magnetic layer in a stable way and increasing the durability in traveling will be described below. The non-magnetic intermediate layer is, in principle, preferably non-magnetic, however, a little magnetic powder may be mixed to a certain degree that does not affect the magnetic layer.

As non-magnetic and inorganic powder and a binding agent mixed in the non-magnetic intermediate layer, a dispersing agent, an antistatic agent, a rust preventive, a lubricant, etc. used as required, and a solvent for preparing the non-magnetic dispersion solution, any of usually well-known materials may be employed without limitation.

For instance, as the non-magnetic and inorganic powder, silica, titanium oxide, alumina, carbon black, alpha-iron oxide, calcium carbonate, chromium oxide, etc. may be exemplified. The form of the powder is not limited to a specific form. However, to reduce the coefficient of thermal/hygroscopic expansion of the tape, a plate shape or an acicular shape is preferable. To control the rigidity of the tape or increase the durability in traveling, alpha-iron oxide is most desirably combined with alumina and the combined product is preferably employed. More preferably, carbon black having an antistatic effect is used together with them.

As the binding agent, for instance, the above-described binding agents for the magnetic layer may be exemplified. The vinyl chloride resin and the polyurethane resin among them are preferably respectively independently used or the mixture thereof is preferably used.

Further, isocyanate may be used as a cross-linking agent for them to more improve the durability. An amount of the binding agent in the non-magnetic intermediate layer is preferably 10 to 50 parts by weight relative to the non-magnetic and inorganic powder of 100 parts by weight.

As the lubricant, for instance, the above-described lubricants for the lubricants for the magnetic layer may be exemplified. The fatty acid is most preferably combined with the fatty acid ester and the combined product is used. As an amount of addition, the fatty acid and the fatty acid ester of 0.1 to 3 parts by weight are respectively preferably added to relative to the non-magnetic and inorganic powder of 100 parts by weight.

Further, as the solvent for preparing the non-magnetic dispersion solution, the above-described solvents for preparing the magnetic dispersion solution may be exemplified.

The non-magnetic intermediate layer is preferably provided with the thickness of 0.2 to 2.5 µm. When the thickness of a film is smaller than 0.2 µm, the magnetic layer is hardly applied in a stable state. When the thickness is larger than 2.5 µm, the thickness of the magnetic tape itself is increased to decrease the length of the tape that can be wound for one reel of the cartridge. Thus, the thick tape causes a high capacity to be prevented.

Now, the back layer will be described below. As inorganic powder and a binding agent mixed in the back layer, a dispersing agent, a lubricant or the like used as required, and a solvent for preparing the back layer dispersion solution, any of usually well-known materials may be used without limitation. In the inorganic powder, a plate shaped or an acicular shaped inorganic powder is preferably contained to increase the strength of the back layer especially in the direction of its width.

For instance, as the plate shaped inorganic powder, mica, kaolin, etc. are exemplified as natural products. Further, as synthesized products, barium sulfate, iron oxide, etc. may be exemplified. The average particle diameter (in the direction of a plane of a plate) of the plate shaped inorganic powder is preferably located from 0.15 to 2.0 µm. The average thickness is preferably 0.005 to 0.1 µm. As the acicular shaped inorganic powder, iron oxide or the like is exemplified. The length of a major axis of the acicular shaped inorganic powder is preferably 0.08 to 0.8 µm and the length of a minor axis is preferably 0.005 to 0.05 µm.

To the back layer, the carbon black is preferably added for an antistatic effect as well as the plate shaped or the acicular shaped inorganic powder. The average particle diameter of the carbon black ranges from 5 to 500 nm. The carbon black preferably having the average particle diameter of 5 to 150 nm, and more preferably having the average particle diameter of 10 to 100 nm is desirably independently used or a plurality sets of the carbon blacks is preferably combined together to use the combined product. Specifically, well-known materials such as acetylene black, furnace black, thermal black, etc. may be independently used or a plurality of the materials may be used.

Further, for the same purpose, the plate shaped or the acicular shaped inorganic powder may be coated with the carbon black that undergoes a surface treatment. In order to prevent the surface change of the back layer due to repeated traveling operations, or to control a signal when the servo signal is optically recorded on the back layer, inorganic powder such as alumina, titanium oxide, calcium carbonate, barium sulfate, chromium oxide, etc. may be mixed therein.

As the binding agent, for instance, the above-described binding agents as the binding agents for the magnetic layer and the non-magnetic intermediate layer may be exemplified. The polyurethane resin and the cellulose resin among them are preferably mixed together to use the mixture thereof. Further, isocyanate may be used as a cross-linking agent for them to more improve the durability. An amount of the binding agent in the back layer is preferably 20 to 150 parts by weight relative to the inorganic powder of the back layer of 100 parts by weight.

Further, as the solvent for preparing the back layer dispersion solution, the above-described solvents for preparing the magnetic dispersion solution and the non-magnetic dispersion solution may be enumerated.

The back layer is preferably formed with the thickness of 0.1 to 1.5 µm.

The paints composed of the above-described magnetic powder and the binder agent or the like, the non-magnetic and inorganic powder and the binding agent or the like, and the inorganic powder for the back layer and the binding agent or the like can be prepared by usually well-known methods. For instance, a sand mill, a roll mill, a ball mill, a kneader, a pressure kneader, an extruder, a homogenizer, a disper, a ultrasonic disperser, etc. may be employed. A preparation for the purpose of kneading by the kneader is most preferably combined with a preparation for the purpose of dispersing by the sand mill to use the combined preparation.

As a method for forming the magnetic dispersion solution on the non-magnetic substrate and the non-magnetic dispersion solution between them as required at the same time or successively, usually well-known methods such as a blade coat, a gravure coat, a dye coat may be employed. The back layer dispersion solution is applied in the same manner as described above. Further, the magnetic dispersion solution may be firstly applied from any of the magnetic layer side and the back layer side on the non-magnetic substrate and may be applied at the same time.

Further, for the purpose of reducing the coefficient of hygroscopic expansion, a water repellent effect may be given to the edge of the tape. As a method for giving the water repellent effect to the edge, a method for supplying a water repellent to a knife of a slitter upon slitting or a method for applying a woven fabric impregnated with the water repellent to the edge of the tape medium after a slitting operation, etc., may be exemplified. As the water repellent, an ester compound of perfluoro polyether and carboxylic acid, perfluoroalkyl carboxylic acid ester, fluorine-containing alkyl succinic acid ester, etc. may be exemplified.

FIG. 1 shows one example of the structure of a section of a magnetic tape medium according to this embodiment. In FIG. 1, a magnetic or non-magnetic layer 2 and a magnetic layer 3 are provided on one surface of a non-magnetic substrate 1 and a back layer 4 is provided on the other surface.

X represents Young's modulus in the direction of width of the non-magnetic substrate 1, Y represents Young's modulus in the direction of width of the back layer 4, and Z represents Young's modulus in the direction of width of a layer including the layer 2 and the magnetic layer 3, respectively.

Now, a preferred embodiment of the present invention will be described on the basis of Examples and Comparative Examples.

EXAMPLE 1

As the non-magnetic substrate, a below-described film was used.

[Non-Magnetic Substrate 1]

Non-magnetic substrate: polyethylene naphthalate (PEN) (thickness; 4.5 µm, Young's modulus: longitudinal direction (MD)/direction of width (TD)=650/850 kg/mm$^2$)

Then, component materials of dispersion solution for forming the magnetic layer, the non-magnetic intermediate layer, and the back layer were prepared in accordance with below described compositions.

| [Magnetic dispersion solution] | | |
|---|---|---|
| Magnetic powder: | iron-cobalt alloy type metallic ferromagnetic powder (average major axis length: 0.1 µm) | 100 parts by weight |
| Binding agent: | polyester type polyurethane resin (average molecular weight: 41200) | 8 parts by weight |
| | vinyl chloride copolymer (average degree of polymerization: 350) | 10 parts by weight |
| Abrasive agent: | alpha-alumina (average particle diameter: 80 nm) | 20 parts by weight |
| Antistatic agent: | carbon black (average particle diameter: 20 nm) | 3 parts by weight |
| Lubricant: | stearic acid | 1 parts by weight |
| | butyl stearate | 2 parts by weight |
| | amide stearate | 0.3 parts by weight |
| Solvent: | methyl ethyl ketone | 20 parts by weight |
| | toluene | 20 parts by weight |
| | cyclohexanone | 10 parts by weight |

The above-described materials were kneaded by a kneader. The kneaded product was further diluted with methyl ethyl ketone, toluene, and cyclohexanone. Then, the obtained product was dispersed by a sand mill and polyisocyanate (a curing agent "Coronate L" produced by Nippon Polyurethane Industry Co., Ltd.) of 4 parts by weight was added to the obtained product. Then, the product was agitated to obtain magnetic dispersion solution.

| [Non-magnetic dispersion solution 1] | | |
|---|---|---|
| Non-Magnetic and inorganic powder: | acicular shaped alpha-iron oxide (average major axis length: 0.15 µm) | 100 parts by weight |
| | alpha-alumina (average particle diameter 70 nm) | 6 parts by weight |
| Binding agent: | polyester type polyurethane resin (average molecular weight: 41200) | 8 parts by weight |
| | vinyl chloride copolymer (average degree of polymerization: 300) | 8 parts by weight |
| Antistatic agent: | carbon black (average particle diameter: 60 nm) | 20 parts by weight |
| Lubricant: | stearic acid | 1 parts by weight |
| | butyl stearate | 2 parts by weight |
| Solvent: | methyl ethyl ketone | 70 parts by weight |
| | toluene | 70 parts by weight |
| | cyclohexanone | 40 parts by weight |

The above-described materials were kneaded by a kneader. The kneaded product was further diluted with methyl ethyl ketone, toluene, and cyclohexanone. Then, the obtained product was dispersed by a sand mill and polyisocyanate (a curing agent "Coronate L" produced by Nippon Polyurethane Industry Co., Ltd.) of 3 parts by weight was added to the obtained product. Then, the product was agitated to obtain non-magnetic dispersion solution.

| [Back Layer dispersion solution 1] | | |
|---|---|---|
| Inorganic powder: | carbon black (average particle diameter: 20 nm) | 100 parts by weight |
| | carbon black (average particle diameter: 70 nm) | 15 parts by weight |
| | plate shaped alpha-iron oxide (average particle diameter: 0.9 µm, average thickness: 0.015 µm) | 10 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, the non-magnetic dispersion solution and the magnetic dispersion solution were sequentially applied on the non-magnetic substrate by a dye coating process at the same time so as to have the thickness of 0.8 µm and 0.1 µm respectively after they were dried. Then, the obtained non-magnetic substrate was subjected to a magnetic filed orientation process and a drying process. The obtained non-magnetic substrate was wound as a roll. After that, a paint for the back layer was applied on the other surface by a dye coating process so as to have the thickness of 0.6 µm after the paint was dried. The obtained non-magnetic substrate was subjected to a drying process and wound as a roll. After a calendering process and a hardening process were applied to the non-magnetic substrate, a slitting process was carried out so as to have the width of ½ inches. Then, the non-magnetic substrate was wound to have a sample.

EXAMPLE 2

As the non-magnetic substrate, a below-described film was used.

[Non-Magnetic Substrate 2]

Non-magnetic substrate: polyethylene naphthalate (PEN) (thickness; 4.5 µm, Young's modulus: longitudinal direction (MD)/direction of width (TD)=650/1000 kg/mm$^2$)

Cu was formed respectively on both the surfaces of PEN with the thickness of 120 nm by using a vacuum deposition method and the obtained product was used as the non-magnetic substrate. Young's modulus in the direction of its width was 1200 kg/mm$^2$.

As a back layer, below-described materials were used.

| [Back layer dispersion solution 2] | | |
|---|---|---|
| Inorganic powder: | acicular shaped alpha-iron oxide (major axis length: 0.25 µm) | 100 parts by weight |

-continued

| | [Back layer dispersion solution 2] | |
|---|---|---|
| | carbon black (average particle diameter: 20 nm) | 20 parts by weight |
| | carbon black (average particle diameter: 70 nm) | 5 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, a sample was obtained under the same conditions as those of the Example 1.

EXAMPLE 3

As the non-magnetic substrate, a below-described film was used.

[Non-Magnetic Substrate 3]

Non-magnetic substrate: polyethylene naphthalate (PEN) (thickness; 4.5 μm, Young's modulus: longitudinal direction (MD)/direction of width (TD)=850/600 kg/mm²)

As a back layer, below-described materials were used.

| | [Back layer dispersion solution 3] | |
|---|---|---|
| Inorganic powder: | carbon black (average particle diameter: 20 nm) | 100 parts by weight |
| | plate shaped alpha-iron oxide (average particle diameter: 0.9 μm, average thickness: 0.015 μm) | 20 parts by weight |
| | carbon black (average particle diameter: 70 nm) | 5 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, a sample was obtained under the same conditions as those of the Example 1.

EXAMPLE 4

As the non-magnetic substrate, a "non-magnetic substrate 3" the same as that of the Example 3 was used. Further, as a back layer, below-described materials were used.

| | [Back layer dispersion solution 4] | |
|---|---|---|
| Inorganic powder: | plate shaped alpha-iron oxide (average particle diameter: 0.9 μm, average thickness: 0.015 μm) | 100 parts by weight |
| | carbon black (average particle diameter: 20 nm) | 20 parts by weight |
| | carbon black (average particle diameter: 70 nm) | 5 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, a sample was obtained under the same conditions as those of the Example 1.

COMPARATIVE EXAMPLE 1

As the non-magnetic substrate, a "non-magnetic substrate 3" the same as that of the Example 3 was used. Further, as a back layer, below-described materials were used.

| | [Back layer dispersion solution 5] | |
|---|---|---|
| Inorganic powder: | carbon black (average particle diameter: 20 nm) | 100 parts by weight |
| | plate shaped alpha-iron oxide (average particle diameter: 0.9 μm, average thickness: 0.015 μm) | 15 parts by weight |
| | carbon black (average particle diameter: 70 nm) | 10 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, a sample was obtained under the same conditions as those of the Example 1.

COMPARATIVE EXAMPLE 2

As the non-magnetic substrate, a "non-magnetic substrate 3" the same as that of the Example 3 was used. Further, as the non-magnetic dispersion solution, below-described materials were used.

| [Non-magnetic dispersion solution 2] | | | |
|---|---|---|---|
| Non-magnetic and inorganic powder: | acicular shaped alpha-iron oxide (average major axis length: 0.15 μm) | 100 | parts by weight |
| | alpha-alumina (average particle diameter: 70 nm) | 6 | parts by weight |
| Binding agent: | polyester type polyurethane resin (average molecular weight: 41200) | 8 | parts by weight |
| | vinyl chloride copolymer (average degree of polymerization: 300) | 8 | parts by weight |
| Antistatic agent: | carbon black (average particle diameter: 60 nm) | 30 | parts by weight |
| Lubricant: | stearic acid | 1 | parts by weight |
| | butyl stearate | 2 | parts by weight |
| Solvent: | methyl ethyl ketone | 70 | parts by weight |
| | toluene | 70 | parts by weight |
| | cyclohexanone | 40 | parts by weight |

Further, as the back layer, below-described materials were used.

| [Back layer dispersion solution 6] | | | |
|---|---|---|---|
| Inorganic powder: | plate shaped alpha-iron oxide (average particle diameter: 0.9 μm, average thickness: 0.015 μm) | 120 | parts by weight |
| | carbon black (average particle diameter: 20 nm) | 5 | parts by weight |
| | titanium oxide (average particle diameter: 100 nm) | 1 | parts by weight |
| Binding agent: | polyester type polyurethane resin (average molecular weight: 71200) | 25 | parts by weight |
| | nitrocellulose resin (average degree of polymerization: 90) | 25 | parts by weight |
| Solvent: | methyl ethyl ketone | 200 | parts by weight |
| | toluene | 200 | parts by weight |
| | cyclohexanone | 50 | parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, a sample was obtained under the same conditions as those of the Example 1.

Thus, various kinds of characteristics were measured for the magnetic tapes obtained in the above-described Examples and the Comparative examples as described below.

(Measurement of Young's Modulus)

The obtained magnetic tape was cut to the size of (longitudinal direction)×(direction of width) of 5 mm×12.65 mm to measure Young's modulus by using RSA-2 produced by Rheometric Scientific, Inc. Subsequently, the tape from which only the layer including the magnetic layer is stripped and the tape from which only the back layer is stripped were measured in the same manner to obtain each Young's modulus.

[Measurement of Coefficient of Hygroscopic Expansion]

The sample obtained by cutting the magnetic tape having the width of ½ inches to the length of 250 mm was used. As a measuring device, a self-device in which a laser scan micrometer (LSM) produced by Keyence Corporation was incorporated was employed. The device in which the sample was set was put in a chamber controlled under a prescribed environment at 25° C. and humidity was changed to 10% RH to 80% RH to measure the change of the width of the tape. Then, the coefficient of hygroscopic expansion was obtained in accordance with a following formula.

<coefficient of hygroscopic expansion>=((change of width of tape)/(initial width of tape))/(change of humidity)

[Measurement of Coefficient of Thermal Expansion]

Temperature was likewise changed to 10° C. to 45° C. under a prescribed environment having the humidity of 50% RH to measure the change of the width of the tape. Then, the coefficient of thermal expansion was obtained in accordance with a following formula.

<coefficient of thermal expansion>=((change of width of tape)/(initial width of tape))/(change of temperature)

[Measurement of Coefficient of Tension Change]

A similar measuring device was used. Under a prescribed environment of 25° C./50% RH, a load changing from 0.2 N to 1.4 N in the longitudinal direction of the sample was successively exerted on the tape to measure the width of the tape under the respective loads. Then, a coefficient of tension change was obtained in accordance with a following formula.

<coefficient of tension change>=|((change of width of tape)/(initial width of tape))/(change of tension)| (|| represents an absolute value)

[Measurement of Change of Creep]

A similar measuring device was used. Under a prescribed environment of 25° C./50% RH, a load of 1.0 N was exerted in the longitudinal direction of the sample to measure the change of the width of the tape for 100 hours. Then, an amount of creep was obtained in accordance with a following formula.

<amount of creep>=|(change of width of tape)/(initial width of tape)| (|| represents an absolute value)

[Measurement of Deterioration of Output in the Same Drive]

An LTO dive on the market was reconstructed and the reconstructed LTO drive was used as a measuring device. Firstly, under a prescribed environment of 45° C./80% RH, the tension of 0.6 N was exerted on the tape to record data and an output obtained when the data was reproduced under this environment immediately after the data was recorded was regarded as a reference. The environment was changed to 10° C./10% RH and the tape was held for 100 hours under the tension of 1 N. Then, the deterioration of the reproduced output was obtained. Under conditions that the track density was 70 lines/mm, the width of a recording track was 12 μm and the width of a reproducing track was 6 μm, that is, an off-track margin A was 3 μm, the measurement was carried out. The material of a magnetic head was AlTiC (coefficient of thermal expansion: 7.0×10 E$^{-6}$/° C.).

[Measurement Of Deterioration Of Output in Separate Drive]

In the above-described drive and under the same prescribed environment of 45° C./80% RH, the tension of 0.6 N was exerted on the tape to record data and an output obtained when the data was reproduced under this environment immediately after the data was recorded was regarded as a reference. Another drive having the same specification as that of the above-described drive was used. Under the prescribed environment of 10° C./10% RH, the tape was held for 100 hours under the tension of 1 N. Then, the deterioration of the reproduced output was obtained. The separate drive has a space of a reproducing head wider by 1.0 μm than that of the above-described drive.

[Initial Output Difference]

In the above-described drive and under a prescribed environment of 25° C./50% RH, the tension of 0.6 N was exerted on the tape to record data. Outputs were obtained from reproducing heads at both ends of a head block when the data was reproduced under this environment immediately after the data was recorded to decide the quality thereof.

The measured results of the samples based on the Examples and the Comparative examples are shown in Table 1. In the Table 1, the coefficient of thermal expansion is represented by (coefficient of thermal expansion in the direction of width of tape)−(coefficient of thermal expansion of magnetic head).

TABLE 1

| | X (base TD Young's modulus) (kg/mm$^2$) | Y (back TD Young's modulus) (kg/mm$^2$) | Z (magnetic layer TD Young's modulus) (kg/mm$^2$) | X × Y |
|---|---|---|---|---|
| Example 1 | 850 | 700 | 700 | 595000 |
| Example 2 | 1200 | 1800 | 700 | 2160000 |
| Example 3 | 600 | 1000 | 700 | 600000 |
| Example 4 | 600 | 2800 | 700 | 1680000 |
| Comparative Example 1 | 600 | 900 | 700 | 540000 |
| Comparative Example 2 | 600 | 4200 | 600 | 2520000 |

| | Y/Z | Coefficient of hygroscopic expansion (×10$^{-6}$/% RH) | Coefficient of thermal expansion (×10$^{-6}$/° C.) | Coefficient of tension change (×10$^{-6}$/N) |
|---|---|---|---|---|
| Example 1 | 1 | 6.8 | 0 | 400 |
| Example 2 | 2.6 | 5.2 | −2.4 | 260 |
| Example 3 | 1.4 | 8.5 | 3.4 | 450 |
| Example 4 | 4 | 8.1 | 2.9 | 420 |
| Comparative Example 1 | 1.3 | 8.8 | 3.9 | 480 |
| Comparative Example 2 | 7 | 7.4 | 2.4 | 400 |

| | Amount of deformation of creep (×10$^{-6}$) | Deterioration of output (%) (the same drive) | Deterioration of output (%) (separate drive) | Initial output |
|---|---|---|---|---|
| Example 1 | 30 | 0.0 | 0.0 | ◯ |
| Example 2 | 20 | 0.0 | 0.0 | ◯ |
| Example 3 | 50 | 0.0 | 0.8 | ◯ |
| Example 4 | 45 | 0.0 | 0.6 | ◯ |
| Comparative Example 1 | 60 | 1.5 | 2.4 | ◯ |
| Comparative Example 2 | 40 | 0.0 | 0.4 | △ |

In accordance with the Table 1, assuming that Young's modulus in the direction of width of the non-magnetic substrate was X and Young's modulus in the direction of width of the back layer was Y, and Young's modulus in the direction of width of the layer including the magnetic layer provided on the other surface of the non-magnetic substrate was Z, X was 850 kg/mm$^2$ or more, or when X was less than 850 kg/mm$^2$, X×Y was set to 6×10$^5$ or more and Y/Z was set to 6.0 or smaller. Namely, in the Examples 1 to 4 located within a range defined by this embodiment of the present invention, good results were obtained that a variation in the direction of width of the tape due to the environmental factors is adequately low and the deterioration of an output in the same drive was low.

In the Comparative example 1 in which X×Y was not located within the range defined by this embodiment of the present invention, the variation in the direction of width of the tape due to the change of temperature and humidity was especially increased. As a result, the deterioration of the output was found in both the same drive and the separate drive. Further, in the Comparative Example 2 in which Y/Z was not located within the range defined by this embodiment of the present invention, the variation in the direction of width of the tape was adequately low and the great deterioration of the output was not found. However, the initial output difference was undesirably large.

Now, another embodiment of the present invention will be described below. The essential idea of the present invention is directed to a magnetic tape medium for recording and reproducing data in the longitudinal direction that includes, on one main surface of a non-magnetic substrate, at least one magnetic layer on which magnetic dispersion solution obtained by dispersing ferromagnetic powder in a binding agent is applied with the thickness of 0.3 μm or smaller and a back layer on which dispersion solution obtained by dispersing inorganic pigment in a binding agent is applied, on a main surface opposite to a side in which the magnetic layer is formed. A servo signal for a tracking control is recorded on either the magnetic layer or the back layer, or on both the layers. A track density in the direction of width being 50 lines/mm or more. An off-track margin A equal to ((recording track width)−(reproducing track width))/2 is 5 μm or smaller. A variation that is permitted at maximum as a dimensional variation in the direction of width due to environmental factors such as the change of temperature and humidity, the change of tension, a creep, etc. is small as low as 0.10% or less. Films made of a metallic material selected from metal, semimetal, alloy, and oxides and compounds of them are provided on both the surfaces of the non-magnetic substrate. The back layer is formed by dispersing inorganic powder including plate shaped or acicular shaped inorganic powder in a binding agent with the thickness of 0.1 to 1.5 μm. Thus, according to another embodiment of the present invention, a great feature can be realized that stable recording and reproducing characteristics with less off-track can be ensured.

On both the surfaces of the non-magnetic substrate, the films made of a metallic material selected from metal, semimetal, alloy, and oxides and compounds of them are provided. Thus, water that enters the non-magnetic substrate occupying the most part of the thickness of the magnetic tape to cause an expansion can be interrupted so that the coefficient of hygroscopic expansion in the direction of width of the magnetic tape can be reduced. When the films are not formed, the water easily enters under high humidity to expand the tape. Accordingly, when an off-track margin is small and the rate of a variation that is permitted at maximum as a variation due to the environmental factors is small, an off-track is caused. Even when the film made of the metallic material is provided only on one surface, the water easily enters from the other surface, so that an effect thereof is hardly achieved.

Further, the back layer formed by dispersing inorganic powder including plate shaped or acicular shaped inorganic powder in a binding agent with the thickness of 0.1 to 1.5 µm is provided on the surface of the back layer side. Thus, the strength of the back layer in the inner planar direction is increased. As a result, the strength of the magnetic tape is increased so that the coefficient of thermal expansion and the coefficient of hygroscopic expansion in the direction of width can be reduced.

Since the strength of the tape in the inner planar direction is enhanced, the dimensional variation in the direction of width that occurs in accordance with the effect of Poisson's ratio when the tension is exerted in the longitudinal direction is decreased. Further, the variation of creep under a state that the tension of 1 N is exerted for a long time can be also decreased.

When the inorganic powder is not included, the strength of the back layer is decreased. Thus, the strength of the tape is decreased. Not only the coefficient of thermal expansion and the coefficient of hygroscopic expansion are undesirably increased, but also the change of the width under the tension exerted in the longitudinal direction is increased. The variation of creep under the load of 1 N is also increased.

As apparent from a further study, when the coefficient of hygroscopic expansion in the direction of width of the tape was not higher than $5.0 \times 10^{-6}/\% \, RH$, an additional effect could be anticipated.

Further, with an actually using environment taken into consideration, when temperature changes, not only the dimension of the magnetic tape is changed, but also a magnetic head for recording and reproducing the data of a track is expanded. Accordingly, (coefficient of thermal expansion in the direction of width)−(coefficient of thermal expansion of a magnetic head for recording and reproducing data) substantially causes the off-track. When this value was $(-1.5 \text{ to } 1.5) \times 10^{-6}/°C$., a further effect could be apparently anticipated.

Further, the films made of the metallic material are provided on the film applied surfaces of the magnetic layer and the back layer of the non-magnetic substrate. Thus, the water entering from these surfaces can be substantially interrupted. However, it was understood that since the edge part of the magnetic tape was not shielded, a little water apparently entered therefrom. Accordingly, a water repellent effect was given to the edge part of the tape, so that a further effect could be anticipated.

Further, when the tension exerted in the longitudinal direction changes so that a rate of dimension change in the direction of width was $120 \times 10 \, E^{-6}/N$ or smaller, due to the effect of Poisson's ratio, a further effect could be anticipated. When the variation in the direction of width was $10 \times 10^{-6}/N$ or smaller upon holding the tape for 100 hours under a state that the tension of 1 N was exerted, an additional effect was evidently anticipated. Here, the tension exerted in the longitudinal direction is located within the area of an elastic change of the magnetic tape. Further, 1 N represents an optimum tension as a tension under which the tape can travel in a stable way in a recording and reproducing drive. The change is substantially saturated for about 100 hours.

The magnetic tape medium of another embodiment of the present invention includes the magnetic layer with the thickness of 0.3 µm or less that is obtained by applying a magnetic paint including magnetic powder such as Fe, Co, etc. and various kinds of binding agents on the non-magnetic substrate made of a polyester plastic film and including on both the surfaces films made of the metallic material selected from metal, semimetal, alloy, and oxides and compounds thereof.

The non-magnetic substrate has the back layer opposite to the magnetic layer obtained by applying the dispersion solution in which the inorganic powder such as the plate shaped or acicular shaped inorganic powder, carbon black, etc. is dispersed in various kinds of binding agents with the thickness of 0.1 to 1.5 µm. The servo signal for a tracking control is magnetically or optically recorded on either the magnetic layer or the back layer or both the layers.

As materials of the non-magnetic substrate in another embodiment of the present invention, polyethylene terephthalate, polyethylene naphthalate, polytetramethylene terephthalate, poly-1,4-cyclohexylene dimethylene terephthalate, polyethylene-p-oxybenzoate, polyimide, polyamide, etc. may be exemplified as ordinary films. The polyester plastic films such as polyethylene terephthalate, polyethylene naphthalate, etc. are especially preferable from the viewpoints of high productivity and relative inexpensiveness.

These films may have a single-layer structure or a multi-layer structure. For the purpose of improving an adhesive property, a surface may be subjected to a surface treatment such as a corona discharge process or an electron beam irradiation process or a formation of an easily adhesive layer. For the purpose of reducing the coefficient of hygroscopic expansion, the surface may undergo a water repellent process.

For the purpose of controlling a surface property and stability in traveling, an inorganic or organic filler such as calcium carbonate, silica, aluminum oxide, polystyrene, etc. may be added therein. As a surface roughness Ra, the surface roughness of the magnetic paint applied surface of the magnetic layer is preferably 0.5 to 8 nm and especially preferably 0.5 to 6 nm. When the surface roughness is smaller than 0.5 nm, a friction with a guide roll is extremely high upon producing the tape to obtain an unstable travel. Accordingly, the above-described surface roughness is not preferable. On the contrary, when the surface roughness is larger than 8 nm, the surface roughness of the tape after the magnetic layer is applied thereto is increased to increase a spacing loss between the tape and the head. Accordingly, the above-described surface roughness is not preferable.

The surface roughness Ra of the dispersion solution applied surface of the back layer is preferably 4 to 25 nm and especially preferably 5 to 15 nm. When the surface roughness is smaller than 4 nm, the unstable travel is caused in processes like the magnetic paint applied surface of the magnetic layer. Thus, the above-described surface roughness is not preferable. Conversely, when the surface roughness is larger than 25 nm, the surface roughness of the tape after the back layer is applied thereto is increased, the roughness of the back layer is transferred to the magnetic layer, when the tape is wound and stored in processes or when the tape is wound and stored in a cartridge. As a result, the roughness of the magnetic layer is increased to cause a spacing loss. Accordingly, the above-described surface roughness is not preferable.

The thickness of the non-magnetic substrate is preferably 2.0 to 8.0 µm and particularly preferably 3.0 to 6.5 µm. When the film is thinner than 2.0 µm, not only the film itself is hardly produced, but also the strength is extremely lowered to decrease a durability in traveling, the change of the width is increased due to the change of tension exerted in the longitudinal direction or creep characteristics are deteriorated. On the contrary, when the film is thicker than 8.0 µm, the thickness of the magnetic tape itself is increased to decrease the length of the tape that can be wound per reel of the cartridge. Thus, the thick film prevents a high capacity from being realized.

The Young's modulus in the longitudinal direction of the non-magnetic substrate is preferably 600 kg/mm$^2$ or higher, particularly preferably 750 kg/mm$^2$ or higher, and more preferably 800 kg/mm$^2$ or higher. When the Young's modulus is lower than 600 kg/mm$^2$, the strength of the magnetic tape itself is weakened or the durability in traveling is deteriorated due to repeated traveling operations. Thus, the Young's modulus lower than 600 kg/mm$^2$ is not preferable. Further, Young's modulus in the direction of width is preferably 400 kg/mm$^2$ or higher, particularly preferably 600 kg/mm$^2$ or higher, and more preferably 650 kg/mm$^2$ or higher. When the Young's modulus is lower than 400 kg/mm$^2$, the coefficient of temperature and humidity expansion of the magnetic tape itself is increased. Accordingly, the Young's modulus lower than 400 kg/mm$^2$ is not preferable.

As the metallic materials of the film provided on the non-magnetic substrate, for instance, metals such as Al, Zn, Ag, Cu, Fe, Ni, etc., semimetals such as Si, Ge, As, etc., alloys such as Fe—Ni, Fe—Cu, etc., and oxides such as $Al_2O_3$, ZnO, $SiO_2$, etc. may be exemplified. The film made of the metallic materials may be formed by a well known method such as a sputtering method, a vacuum deposition method, an ion plating method, etc. The oxides may be produced by introducing prescribed oxygen gas upon forming a metallic film.

The thickness of the film made of the metallic material is preferably 10 nm or more. When the thickness of the film is smaller than 10 nm, parts that are not completely covered with the film are formed due to the irregularities of the non-magnetic substrate itself. Thus, water enters from the parts so that not only the coefficient of hygroscopic expansion is increased, but also the film is easily stripped off during traveling in processes. As a result, a dropping out phenomenon is undesirably caused.

Further, as the thickness of the film provided in the back layer side, assuming that the thickness of the film provided in the magnetic layer side is 1, the thickness of the film in the back layer side is preferably 0.5 to 1.4, especially preferably 0.7 to 1.2, and more preferably 0.8 to 1.0. That is, the thickness of the film provided in the back layer side is more preferably the same as or slightly smaller than the thickness of the film provided in the magnetic layer side. When this value is lower than 0.5 or exceeds 1.4, the non-magnetic substrate itself is seriously curled or inconveniently hardly handled in processes. Thus, the magnetic tape is undesirably extremely cupped or curled.

Between the non-magnetic substrate and the magnetic layer, and between the non-magnetic substrate and the back layer, non-magnetic intermediate layers made of various kinds of inorganic power and biding agents may be provided. Especially, the non-magnetic intermediate layer between the non-magnetic substrate and the magnetic layer is preferably provided with the thickness of 0.2 to 2.5 µm to apply the magnetic layer in a stable way and increase the durability in traveling.

Further, as the magnetic powder mixed in the magnetic layer, the binding agent, a dispersing agent, an abrasive agent, an antistatic agent, a rust preventive, a lubricant and a solvent employed for preparing the magnetic dispersion solution, any of usually well-known materials can be used without limitation.

The magnetic powder mixed in the magnetic layer or the components of the solvent are the same as those described in the above-described embodiment.

The non-magnetic intermediate layer is preferably provided with the thickness of 0.2 to 2.5 µm for the purpose of applying the magnetic layer in a stable way and increasing the durability in traveling. The non-magnetic intermediate layer is, in principle, preferably non-magnetic, however, a little magnetic powder may be mixed therein to a certain degree that does not affect the magnetic layer.

As non-magnetic and inorganic powder and a binding agent mixed in the non-magnetic intermediate layer, a dispersing agent, an antistatic agent, a rust preventive, a lubricant, etc. used as required, and a solvent for preparing the non-magnetic dispersion solution, any of usually well-known materials may be employed without limitation. The components of them are the same as those of the above-described embodiment.

Now, the back layer will be described below. As inorganic powder including plate shaped or acicular shaped inorganic powder and a binding agent mixed in the back layer, a dispersing agent, a lubricant or the like used as required, and a solvent used for preparing the back layer dispersion solution, any of usually well-known materials may be used without limitation.

For instance, as the plate shaped inorganic powder, mica, kaolin, etc. are exemplified as natural products. Further, as synthesized products, barium sulfate, iron oxide, etc. may be exemplified. The average particle diameter (in the direction of a plane of a plate) of the plate shaped inorganic powder is preferably located from 0.15 to 2.0 µm. The average thickness is preferably 0.005 to 0.1 µm. As the acicular shaped inorganic powder, iron oxide or the like is exemplified. The length of a major axis of the acicular shaped inorganic powder is preferably 0.08 to 0.8 µm and the length of a minor axis is preferably 0.005 to 0.05 µm.

To the back layer, the carbon black of 5 to 200 parts by weight, preferably of 5 to 100 parts by weight, and more preferably of 5 to 50 parts by weight is desirably added relative to the plate shaped or acicular shaped inorganic powder of 100 parts by weight for an antistatic effect as well as the plate shaped or the acicular shaped inorganic powder. The average particle diameter of the carbon black ranges from 5 to 500 nm. The carbon black preferably having the average particle diameter of 5 to 150 nm, and more preferably having the average particle diameter of 10 to 100 nm is desirably independently used or a plurality sets of the carbon blacks is preferably combined together to use the combined product. Specifically, well-known materials such as acetylene black, furnace black, thermal black, etc. may be independently used or a plurality of the materials may be used.

Further, for the same purpose, the plate shaped or the acicular shaped inorganic powder may be surface treated and coated with the carbon black of 5 to 30 parts by weight, preferably of 5 to 20 parts by weight relative to the plate shaped or the acicular shaped inorganic powder of 100 parts by weight.

In order to prevent the surface change of the back layer due to repeated traveling operations, or to control a signal when the servo signal is optically recorded on the back layer, inorganic powder such as alumina, titanium oxide, calcium carbonate, barium sulfate, chromium oxide, etc. may be mixed therein.

As the binding agent, for instance, the above-described binding agents as the binding agents for the magnetic layer and the non-magnetic intermediate layer may be exemplified. The polyurethane resin and the cellulose resin among them are preferably mixed together to use the mixture thereof. Further, isocyanate may be used as a cross-linking agent for them to more improve the durability. An amount of the binding agent in the back layer is preferably 20 to 150 parts by weight relative to the inorganic powder of the back layer of 100 parts by weight.

Further, as the solvent for preparing the back layer dispersion solution, the above-described solvents for preparing the magnetic dispersion solution and the non-magnetic dispersion solution may be enumerated.

The back layer is preferably formed with the thickness of 0.1 to 1.5 μm. When the thickness of the back layer is lower than 0.1 μm, the strength of the back layer is not adequately increased. Thus, the strength of the magnetic tape is not adequately increased, so that not only the coefficient of thermal expansion and the coefficient of hygroscopic expansion in the direction of width are increased, but also the change of the width is increased due to the tension exerted in the longitudinal direction. As a result, a variation of creep under the load of 1 N is also increased. On the contrary, when the thickness of the back layer is larger than 1.5 μm, the thickness of the magnetic tape itself is increased. Thus, the length of the tape that can be wound for one reel of a cartridge is decreased. Accordingly, the thick back layer prevents a high capacity from being realized. Further, the cupping of the tape is undesirably increased or the abutting characteristics of the tape on a head is deteriorated.

The paints composed of the above-described magnetic powder and the binder agent or the like, the non-magnetic and inorganic powder and the binding agent or the like, and the inorganic powder for the back layer and the binding agent or the like can be prepared by usually well-known methods. For instance, a sand mill, a roll mill, a ball mill, a kneader, a pressure kneader, an extruder, a homogenizer, a disper, an ultrasonic disperser, etc. may be employed. A preparation for the purpose of kneading by the kneader is most preferably combined with a preparation for the purpose of dispersing by the sand mill to use the combined preparation.

As a method for forming the magnetic dispersion solution on the non-magnetic substrate and the non-magnetic dispersion solution between them as required at the same time or successively, usually well-known methods such as a blade coat, a gravure coat, a dye coat may be employed. The back layer dispersion solution is applied in the same manner as described above. Further, the dispersion solution may be firstly applied from any of the magnetic layer side and the back layer side on the non-magnetic substrate and may be applied at the same time.

Further, for the purpose of reducing the coefficient of hygroscopic expansion, a water repellent effect may be given to the edge of the tape. As a method for giving the water repellent effect to the edge, a method for supplying a water repellent to a knife of a slitter upon slitting or a method for applying a woven fabric impregnated with the water repellent to the edge of the tape medium after a slitting operation, etc, may be exemplified. As the water repellent, an ester compound of perfluoro polyether and carboxylic acid, perfluoroalkyl carboxylic acid ester, fluorine-containing alkyl succinic acid ester, etc. may be exemplified.

Figure 2:
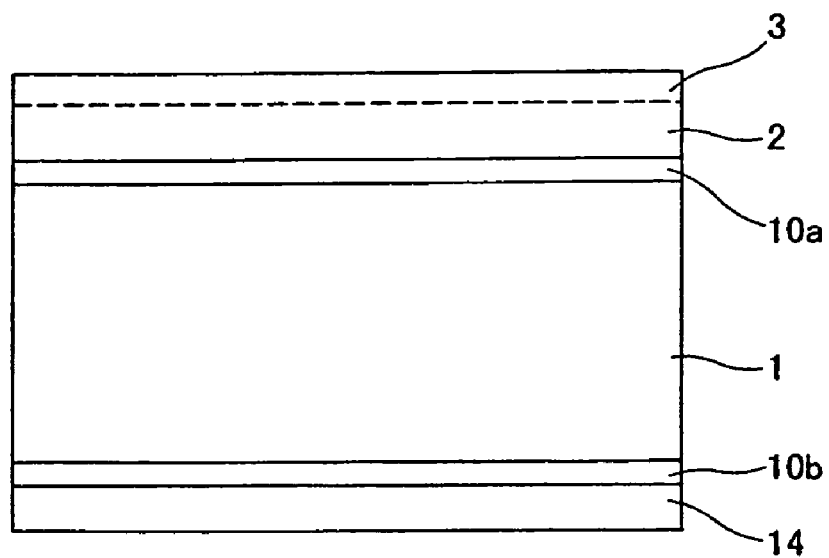
FIG. 2 is a sectional view showing another embodiment of the present invention.

FIG. 2 shows one example of the structure of a section of a magnetic tape medium according to this embodiment. In FIG. 2, on both the surfaces of a non-magnetic substrate 1, films 10a and 10b made of a metallic material are respectively provided. On the film 10a, a magnetic or non-magnetic layer 2 and a magnetic layer 3 are provided. On the film 10b, a back layer 14 is provided.

Now, a preferred embodiment of the present invention will be described on the basis of Examples and Comparative Examples.

EXAMPLE 5

Initially, on both the surfaces of a below-described non-magnetic substrate, Cu having the thickness of 600 Å for one surface was formed by using a vacuum deposition method.

[Non-Magnetic Substrate]

Non-magnetic substrate: polyethylene naphthalate (PEN) (thickness; 6.0 μm, Young's modulus: longitudinal direction (MD)/direction of width (TD)=800/650 kg/mm$^2$)

Then, component materials of dispersion solution for forming the magnetic layer, the non-magnetic intermediate layer, and the back layer were prepared in accordance with below described compositions.

| [Magnetic dispersion solution] | | |
|---|---|---|
| Magnetic powder: | iron-cobalt alloy type metallic ferromagnetic powder (average major axis length: 0.1 μm) | 100 parts by weight |
| Binding agent: | polyester type polyurethane resin (average molecular weight: 41200) | 8 parts by weight |
| | vinyl chloride copolymer (average degree of polymerization: 350) | 10 parts by weight |
| Abrasive agent: | alpha-alumina (average particle diameter: 80 nm) | 20 parts by weight |
| Antistatic agent: | carbon black (average particle diameter: 20 nm) | 3 parts by weight |
| Lubricant: | stearic acid | 1 parts by weight |
| | butyl stearate | 2 parts by weight |
| | amide stearate | 0.3 parts by weight |
| Solvent: | methyl ethyl ketone | 20 parts by weight |
| | toluene | 20 parts by weight |
| | cyclohexanone | 10 parts by weight |

The above-described materials were kneaded by a kneader. The kneaded product was further diluted with methyl ethyl ketone, toluene, and cyclohexanone. Then, the obtained product was dispersed by a sand mill and polyisocyanate (a curing agent "Coronate L" produced by Nippon Polyurethane Industry Co., Ltd.) of 4 parts by weight was added to the obtained product. Then, the product was agitated to obtain magnetic dispersion solution.

| [Non-magnetic dispersion solution] | | |
|---|---|---|
| Non-magnetic and inorganic powder: | acicular shaped alpha-iron oxide (average major axis length: 0.15 μm) | 100 parts by weight |
| | alpha-alumina (average particle diameter 70 nm) | 6 parts by weight |
| Binding agent: | polyester type polyurethane resin (average molecular weight: 41200) | 8 parts by weight |

-continued

| [Non-magnetic dispersion solution] | | |
|---|---|---|
| | vinyl chloride copolymer (average degree of polymerization: 300) | 8 parts by weight |
| Antistatic agent: | carbon black (average particle diameter: 60 nm) | 20 parts by weight |
| Lubricant: | stearic acid | 1 parts by weight |
| | butyl stearate | 2 parts by weight |
| Solvent: | methyl ethyl ketone | 70 parts by weight |
| | toluene | 70 parts by weight |
| | cyclohexanone | 40 parts by weight |

The above-described materials were kneaded by a kneader. The kneaded product was further diluted with methyl ethyl ketone, toluene, and cyclohexanone. Then, the obtained product was dispersed by a sand mill and polyisocyanate (a curing agent "Coronate L" produced by Nippon Polyurethane Industry Co., Ltd.) of 3 parts by weight was added to the obtained product. Then, the product was agitated to obtain non-magnetic dispersion solution.

| [Back Layer dispersion solution 7] | | |
|---|---|---|
| Inorganic powder: | plate shaped alpha-iron oxide (average particle diameter: 0.6 µm, average thickness: 0.01 µm) | 100 parts by weight |
| | carbon black (average particle diameter: 20 nm) | 40 parts by weight |
| | carbon black (average particle diameter: 70 nm) | 5 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

Then, the non-magnetic dispersion solution and the magnetic dispersion solution were sequentially applied on the non-magnetic substrate having Cu formed on both the surfaces under a vacuum deposition process by a dye coating process at the same time so as to have the thickness of 1.3 µm and 0.1 µm respectively after they were dried. Then, the obtained non-magnetic substrate was subjected to a magnetic filed orientation process and a drying process. The obtained non-magnetic substrate was wound as a roll. After that, a paint for the back layer was applied on the other surface by a dye coating process so as to have the thickness of 0.6 µm after the paint was dried. The obtained non-magnetic substrate was subjected to a drying process and wound as a roll. After a calendering process and a hardening process were applied to the non-magnetic substrate, a slitting process was carried out so as to have the width of ½ inches. Then, the non-magnetic substrate was wound to have a sample.

EXAMPLE 6

A sample was obtained in the same manner as that of the Example 5 except that $Al_2O_3$ was used as the material of films provided on both the surfaces of the non-magnetic substrate and [Back layer dispersion solution 8] was employed in which acicular shaped alpha-iron oxide (major axis length: 0.15 µm) was used in place of plate shaped alpha-iron oxide as inorganic powder used for the back layer.

| [Back layer dispersion solution 8] | | |
|---|---|---|
| Inorganic powder: | acicular shaped alpha-iron oxide (major axis length: 0.15 µm) | 100 parts by weight |
| | carbon black (average particle diameter: 20 nm) | 40 parts by weight |
| | carbon black (average particle diameter: 70 nm) | 5 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

EXAMPLE 7

A sample was obtained in the same manner as that of the Example 5 except that Al was used as the material of films provided on both the surfaces of the non-magnetic substrate and the thickness of the back layer was 0.1 µm.

EXAMPLE 8

A sample was obtained in the same manner as that of the Example 5 except that Al was used as the material of films provided on both the surfaces of the non-magnetic substrate and the thickness of the back layer was 1.5 µm.

EXAMPLE 9

A sample was obtained in the same manner as that of the Example 5 except that a water repellent process was applied to the surface of the non-magnetic substrate on which Cu was formed on both the surfaces under a vacuum deposition process by using Fomblin Z-diac produced by Solvay Solexis, Inc. and the obtained non-magnetic substrate was employed. In this case, the water repellent process was a process performed to the non-magnetic substrate immediately before the magnetic layer and the back layer were respectively applied thereto.

EXAMPLE 10

A sample was obtained in the same manner as that of the Example 5 except that as the non-magnetic substrate, polyethylene naphthalate (PEN) having the thickness of 6.0 µm and the Young's modulus: longitudinal direction (MD)/direction of width (TD)=600/900 kg/mm²) was used.

EXAMPLE 11

A sample was obtained in the same manner as that of the Example 5 except that a water repellent process was applied to the tape edge after a slitting operation by applying Toraysee produced by Toray Industries, Inc. that was impregnated with the above-described Fomblin Z-diac thereto.

EXAMPLE 12

A sample was obtained in the same manner as that of the Example 5 except that as the non-magnetic substrate, polyethylene terephthalate (PET) having the thickness of 6.0 μm and the Young's modulus: longitudinal direction (MD)/direction of width (TD)=850/400 kg/mm²) was used.

EXAMPLE 13

A sample was obtained in the same manner as that of the Example 5 except that the tape after the slitting operation was thermally treated at 70° C. for 120 hours.

COMPARATIVE EXAMPLE 3

A sample was obtained in the same manner as that of the Example 5 except that the films made of the metallic material were not provided on the surfaces of the non-magnetic substrate.

COMPARATIVE EXAMPLE 4

A sample was obtained in the same manner as that of the Example 5 except that Cu having the thickness of 600 Å was applied only on the Cu applied surface of the back layer of the non-magnetic substrate under a vacuum deposition process.

COMPARATIVE EXAMPLE 5

A sample was obtained in the same manner as that of the Example 5 except that as back layer dispersion solution, [Back layer dispersion solution 9] as described below was used.

| [Back layer dispersion solution 9] | | |
|---|---|---|
| Inorganic powder: | carbon black (average particle diameter: 20 nm) | 100 parts by weight |
| | carbon black (average particle diameter: 70 nm) | 15 parts by weight |
| | titanium oxide (average particle diameter: 100 nm) | 1 parts by weight |
| Binding agent: | polyester type polyurethane resin (average molecular weight: 71200) | 25 parts by weight |
| | nitrocellulose resin (average degree of polymerization: 90) | 25 parts by weight |
| Solvent: | methyl ethyl ketone | 200 parts by weight |
| | toluene | 200 parts by weight |
| | cyclohexanone | 50 parts by weight |

The above-described materials were mixed together, then, dispersed by a sand mill and polyisocyanate (a curing agent "Coronate L" produced by Nippon Polyurethane Industry Co., Ltd.) of 10 parts by weight was added to the obtained product. Then, the product was agitated to obtain back layer dispersion solution.

COMPARATIVE EXAMPLE 6

A sample was obtained in the same manner as that of the Example 5 except that the thickness of the back layer was 0.05 μm.

COMPARATIVE EXAMPLE 7

A sample was obtained in the same manner as that of the Example 5 except that the thickness of the back layer was 1.55 μm.

Thus, various kinds of characteristics were measured for the magnetic tapes obtained in the above-described Examples and the Comparative examples as described below.

[Measurement of Coefficient of Hygroscopic Expansion]

The sample obtained by cutting the magnetic tape having the width of ½ inches to the length of 250 mm was used. As a measuring device, a self-device in which a laser scan micrometer (LSM) produced by Keyence Corporation was incorporated was employed. The device in which the sample was set was put in a chamber controlled under a prescribed environment at 25° C. and humidity was changed to 10% RH to 80% RH to measure the change of the width of the tape. Then, the coefficient of hygroscopic expansion was obtained in accordance with a following formula.

<coefficient of hygroscopic expansion>=((change of width of tape)/(initial width of tape))/(change of humidity)

[Measurement of Coefficient of Thermal Expansion]

Temperature was likewise changed to 10° C. to 45° C. under a prescribed environment having the humidity of 50% RH to measure the change of the width of the tape. Then, the coefficient of thermal expansion was obtained in accordance with a following formula.

<coefficient of thermal expansion>=((change of width of tape)/(initial width of tape))/(change of temperature)

[Measurement of Coefficient of Tension Change]

A similar measuring device was used. Under a prescribed environment of 25° C./50% RH, a load changing from 0.2 N to 1.4 N in the longitudinal direction of the sample was successively exerted on the tape to measure the width of the tape under the respective loads. Then, a coefficient of tension change was obtained in accordance with a following formula.

<coefficient of tension change>=|((change of width of tape)/(initial width of tape))/(change of tension)| (|| represents an absolute value)

[Measurement of Change of Creep]

A similar measuring device was used. Under a prescribed environment of 25° C./50% RH, a load of 1.0 N was exerted in the longitudinal direction of the sample to measure the change of the width of the tape for 100 hours. Then, an amount of creep was obtained in accordance with a following formula.

<amount of creep>=|(change of width of tape)/(initial width of tape)| (|| represents an absolute value)

[Measurement of Deterioration of Output in the Same Drive]

An LTO drive on the market was reconstructed and the reconstructed LTO drive was used as a measuring device. Firstly, under a prescribed environment of 45° C./80% RH, the tension of 0.6 N was exerted on the tape to record data and an output obtained when the data was reproduced under this environment immediately after the data was recorded was regarded as a reference. The environment was changed to 10° C./10% RH and the tape was held for 100 hours under the tension of 1 N. Then, the deterioration of the reproduced output was obtained. Under conditions that the track density was 70 lines/mm, the width of a recording track was 12 μm and the width of a reproducing track was 6 μm, that is, an off-track margin A was 3 μm, the measurement was carried out. The material of a magnetic head was AlTiC (coefficient of thermal expansion: $7.0 \times 10 \, E^{-6}/°C$.).

[Measurement of Deterioration of Output in Separate Drive]

In the above-described drive and under the same prescribed environment of 45° C./80% RH, the tension of 0.6 N was exerted on the tape to record data and an output obtained when the data was reproduced under this environment immediately after the data was recorded was regarded as a reference. Another drive having the same specification as that of the above-described drive was used. Under the prescribed environment of 10° C./10% RH, the tape was held for 100 hours under the tension of 1 N. Then, the deterioration of the reproduced output was obtained. The separate drive has a space of a reproducing head wider by 1.0 μm than that of the above-described drive.

[Initial Output Difference]

In the above-described drive and under a prescribed environment of 25° C./50% RH, the tension of 0.6 N was exerted on the tape to record data. Outputs were obtained from reproducing heads at both ends of a head block when the data was reproduced under this environment immediately after the data was recorded to decide the quality thereof.

The measured results of the samples based on the Examples and the Comparative Examples are shown in Table 2. In the Table 2, the coefficient of thermal expansion is represented by (coefficient of thermal expansion in the direction of width of tape)−(coefficient of thermal expansion of magnetic head).

TABLE 2

| | Film made of metallic material | Back layer | Thickness of back layer | Coefficient of hygroscopic expansion ($\times 10^{-6}$/% RH) |
|---|---|---|---|---|
| Example 5 | Cu | Back layer dispersion solution 7 | 0.6 μm | 6.3 |
| Example 6 | Al$_2$O$_3$ | Back layer dispersion solution 8 | 0.6 μm | 6.1 |
| Example 7 | Al | Back layer dispersion solution 7 | 0.1 μm | 7.7 |
| Example 8 | Al | Back layer dispersion solution 7 | 1.5 μm | 5.2 |
| Example 9 | Cu | Back layer dispersion solution 7 | 0.6 μm | 4.9 |
| Example 10 | Cu | Back layer dispersion solution 7 | 0.6 μm | 4.1 |
| Example 11 | Cu | Back layer dispersion solution 7 | 0.6 μm | 2.4 |
| Example 12 | Cu | Back layer dispersion solution 7 | 0.6 μm | 6.3 |
| Example 13 | Cu | Back layer dispersion solution 7 | 0.6 μm | 6.3 |
| Comparative Example 3 | None | Back layer dispersion solution 7 | 0.6 μm | 8.8 |
| Comparative Example 4 | Cu (one surface) | Back layer dispersion solution 7 | 0.6 μm | 8.7 |
| Comparative Example 5 | Cu | Back layer dispersion solution 9 | 0.6 μm | 7.9 |
| Comparative Example 6 | Cu | Back layer dispersion solution 7 | 0.05 μm | 8.0 |
| Comparative Example 7 | Cu | Back layer dispersion solution 7 | 1.55 μm | 5.0 |

| | Coefficient of thermal expansion ($\times 10^{-6}$/°C.) | Water repellent process of edge | Coefficient of tension change ($\times 10^{-6}$/N) | Amount of deformation of creep ($\times 10^{-6}$) |
|---|---|---|---|---|
| Example 5 | 4.8 | Not applied | 300 | 50 |
| Example 6 | 4.5 | Not applied | 290 | 45 |
| Example 7 | 6.2 | Not applied | 330 | 60 |
| Example 8 | 4.1 | Not applied | 230 | 40 |
| Example 9 | 4.8 | Not applied | 300 | 50 |
| Example 10 | 0.2 | Not applied | 300 | 50 |
| Example 11 | 4.8 | Applied | 300 | 50 |
| Example 12 | 8.0 | Not applied | 110 | 30 |
| Example 13 | 4.8 | Not applied | 300 | 5 |
| Comparative Example 3 | 4.9 | Not applied | 310 | 90 |
| Comparative Example 4 | 4.9 | Not applied | 310 | 100 |
| Comparative Example 5 | 6.3 | Not applied | 400 | 80 |
| Comparative Example 6 | 6.4 | Not applied | 410 | 85 |
| Comparative Example 7 | 3.9 | Not applied | 210 | 35 |

| | Initial output | Deterioration of output (%) (the same drive) | Deterioration of output (%) (separate drive) |
|---|---|---|---|
| Example 5 | ◯ | 0 | 1.0 |
| Example 6 | ◯ | 0 | 0.7 |
| Example 7 | ◯ | 0 | 1.5 |
| Example 8 | ◯ | 0 | 0 |
| Example 9 | ◯ | 0 | 0.5 |
| Example 10 | ◯ | 0 | 0 |
| Example 11 | ◯ | 0 | 0 |
| Example 12 | ◯ | 0 | 0.7 |
| Example 13 | ◯ | 0 | 0.5 |
| Comparative Example 3 | ◯ | 1.2 | 2.6 |
| Comparative Example 4 | ◯ | 0.8 | 2.4 |
| Comparative Example 5 | ◯ | 1.5 | 2.9 |
| Comparative Example 6 | ◯ | 1.7 | 3.8 |
| Comparative Example 7 | Δ | 0 | 0 |

As apparent from the Table 2, in the Examples 5 to 8 in which the films made of the metallic material were provided in both the surfaces of the non-magnetic substrate, the plate shaped or acicular shaped inorganic powder was contained in the back layer and the thickness of the back layer was located within the range defined in this embodiment of the present invention, good results as described blow were obtained. For instance, the variation in the direction of width of the tape due to the environmental factors was adequately low, the deterioration of the output in the same drive was not found and the deterioration of the output in the separate drive was low.

In the Example 9 in which the coefficient of hygroscopic expansion was smaller, the Example 10 in which (coefficient of thermal expansion in the direction of width)−(coefficient of thermal expansion of magnetic head) was smaller, the Example 11 in which the water repellent process was given to the tape edge, the Example 12 in which the change of tension was suppressed to a low value and the Example 13 in which the change of creep was suppressed to a low value, better results were respectively obtained.

In the Comparative Examples 3 and 4 in which the film made of the metallic material was not provided or was provided only on one surface, the coefficient of humidity was especially high. As a result, the deterioration of the output was found in both the same drive and the separate drive. In the Comparative example 5 in which the plate shaped or acicular shaped inorganic powder was not included in the back layer, the variation of the width of the tape resulting from the change of temperature and humidity was increased and a great deterioration of the output was recognized.

In the Comparative Example 6 in which the thickness of the back layer was not located in the lower limit of the range defined by this embodiment of the present invention, the strength of the medium was seriously low. As a result, the variation of the width was very large and the deterioration of the output was high. In the Comparative Example 7 in which the thickness of the back layer exceeded the upper limit of the range defined by this embodiment of the present invention, the deterioration of the output was not found both in the same drive and the separate drive. However, the tape cupping was extremely great and the abutting characteristics of the tape upon the head were deteriorated and the initial output difference was increased.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic tape medium for recording and reproducing data in the longitudinal direction comprising:
 a non-magnetic substrate;
 a first metal layer formed directly on a first surface of the non-magnetic substrate;
 a first magnetic layer formed on the first metal layer;
 a second magnetic layer formed on the first magnetic layer, the second magnetic layer including ferromagnetic powder dispersed in a binding agent and having a thickness of 0.3 µm or smaller;
 a second metal layer formed directly on a second surface of the non-magnetic substrate opposite the first surface of the non-magnetic substrate;
 a back layer formed on the second metal layer, the back layer including plate shaped or acicular shaped inorganic powder dispersed in a second binding agent and having a thickness of 0.1 to 1.5 µm,
 wherein a servo signal for a tracking control being recorded on at least one of the second magnetic layer and the back layer, a track density in the direction of width being 50 lines/mm or more, an off-track margin A equal to ((recording track width)−(reproducing track width))/2 being 5 µm or smaller, and a variation that is permitted at maximum as a dimensional variation in the direction of width due to environmental factors being small as low as 0.10% or less, and
 wherein the first metal layer and the second metal layer are made of a metallic material selected from metal, semimetal, alloy, and oxides and compounds of them.

2. The magnetic tape medium according to claim 1, wherein a coefficient of hygroscopic expansion in the direction of width is not higher than $5.0 \times 10^{-6}$/% RH.

3. The magnetic tape medium according to claim 1, wherein (coefficient of thermal expansion in the direction of width)−(coefficient of thermal expansion of a magnetic head for recording and reproducing data) is $(-1.5$ to $1.5) \times 10^{-6}$/° C.

4. The magnetic tape according to claim 1, wherein a water repellent effect is given to an edge.

5. The magnetic tape medium according to claim 1, wherein a rate of dimension change in the direction of width due to the change of tension exerted in the longitudinal direction is $120 \times 10^{-6}$/N or smaller.

6. The magnetic tape according to claim 1, wherein an amount of deformation in the direction of width when the tape is held for 100 hours under a state that the tension of 1 N is exerted in the longitudinal direction is $10 \times 10^{-6}$ or smaller.

* * * * *